(12) United States Patent
Solbach

(10) Patent No.: US 6,404,378 B1
(45) Date of Patent: Jun. 11, 2002

(54) DEVICE FOR INCREASING THE DYNAMIC RANGE OF FREQUENCY-MODULATED CONTINUOUS-WAVE RADAR

(75) Inventor: Klaus Solbach, Mülheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/556,420

(22) Filed: Apr. 24, 2000

(30) Foreign Application Priority Data

Apr. 24, 1999 (DE) .......................................... 199 18 767

(51) Int. Cl.[7] .............................................. G01S 13/93
(52) U.S. Cl. ............................ 342/70; 342/91; 342/128; 342/205
(58) Field of Search ............................. 342/70, 71, 72, 342/89, 91, 92, 93, 128, 159, 195, 205

(56) References Cited

FOREIGN PATENT DOCUMENTS

EP         0 372 641        6/1990

OTHER PUBLICATIONS

P.D.L. Beasley, et al., "Solving the Problems of a Single Antenna Frequency Modulated CW Radar", *IEEE International Radar Conference*, 1990, pp. 391–395.

F. J. O'Hara et al., "A High Performance CW Receiver Using Feedthru Nulling", *Microwave Journal*, Sep. 1963, pp. 63–71.

A.G. Stove, "Linear FMCW radar techniques", IEE Proceedings–F, vol. 139, No. 5, Oct. 1992, pp. 343–350.

*Primary Examiner*—John B. Sotomayor
(74) *Attorney, Agent, or Firm*—Kenyon & Kenyon

(57) ABSTRACT

A device for increasing the dynamic range of frequency-modulated continuous-wave radar includes a transmitter, a send/receive antenna, a receiver circuit and a circulator. The circulator relays the transmission signals of the transmitter to the send/receive antenna and sends the echo signals of a target object to the input of the receiver circuit, which generates on the basis of the transmission signals and echo signals an intermediate frequency signal having a differential frequency corresponding to the distance from the target object. A reflected power canceler circuit equipped with a control amplifier is provided between the input and output of the receiver circuit. The frequency response of the control amplifier is selected so that the degree of suppression drops to a predeterminable extent with an increase in differential frequency above the cut-off frequency of the control amplifier.

8 Claims, 2 Drawing Sheets

DEVICE FOR INCREASING THE DYNAMIC RANGE OF FREQUENCY-MODULATED CONTINUOUS-WAVE RADAR

FIELD OF THE INVENTION

The present invention provides a device for increasing the dynamic range of frequency-modulated continuous-wave radar.

RELATED TECHNOLOGY

A distinction is made in the broad sense between pulsed and continuous-wave designs of radar systems.

Pulsed radar determines the distance of a target object from a radar receiver from the transit time of pulses (echo signals) reflected by a target object. To compensate for the great differences in the echo signals to be processed in the radar receiver from short and great distances (near echos and far echos), the distance dynamics as it is called, the sensitivity of the radar receiver is regulated in pulsed radar as a function of time (sensitivity time control, or STC) so that at the beginning of the reception period, a low sensitivity is combined with a high echo level from the near range and vice versa.

In contrast with pulsed radar, continuous-wave radar operates with a continuously emitted transmission signal. With pulsed radar, the transmission signal can be separated from the echo signal by the fact that both signals occur at different times, but with continuous-wave radar, the transmission signals are separated and differentiated from the echo signals by modulation of the wave, i.e., by frequency modulation in practice.

The concept of time-dependent sensitivity of the radar receiver, which is known from pulsed radar, cannot be used with continuous-wave radar, in particular frequency-modulated continuous-wave radar (FM CW radar), because all the echo signals of the target object always have to be processed at the same time, so no differentiation in time is possible.

It is known here that the dynamics of the video signals or intermediate frequency signals generated in the radar receiver from the echo signals can be reduced before further processing—e.g., by an analog/digital converter module—by using a high-pass filter of suitable dimensions. Thus, the low video frequencies belonging to near targets (near echos) are reduced to a greater extent than higher video frequencies belonging to more remote targets (far echos).

However, this measure acts only downstream from the high frequency component of the radar receiver, so that when multiple signals coincide, especially signals of extremely different levels (such as near and far echos), additional signals are generated due to intermodulation and other nonlinear processes and are interpreted as target objects (unwanted false targets) by the radar.

The range and other system parameters of frequency-modulated continuous-wave radar are therefore determined to a great extent by the full-power signal strength of the high-frequency components of the radar receiver, the dynamic range between the largest processable signal level and the lower sensitivity limit (noise level). According to the related art, 60 dB is achieved, for example, with a traditional design of such radar receivers, or even up to 90 dB with mixers and input modules designed to be especially strong at high powers and driven with correspondingly high currents and local oscillator powers.

SUMMARY OF THE INVENTION

An object of the present invention is therefore to provide a device which produces an increase in the dynamic range of frequency-modulated continuous-wave radar.

Another object of the present invention is to provide a receiver for a frequency-modulated continuous-wave radar which can function with a lower power.

Within the scope of the above objects, a goal of the present invention is to provide a receiver for a frequency-modulated continuous-wave radar that is suitable for monolithic integration, such as a microwave monolithic integrated circuit, or MMIC—e.g., for applications in an automobile radar system.

Another object of the present invention is to provide a radar receiver with an increased dynamic range and with a low power consumption that is suitable for monolithic integration in particular.

The present invention provides a device for increasing the dynamic range of frequency-modulated continuous-wave radar including a transmitter (13), a send/receive antenna (6), a receiver circuit (9, 10), a circulator (5) for relaying the transmission signals of the transmitter (13) to the send/receive antenna (6) and for diverting the echo signals of a target object to the input of the receiver circuit (9, 10). The receiver circuit (9, 10) is designed to generate on the basis of the transmission signals and echo signals a signal (7) having a differential frequency corresponding to the distance from the target object. An RPC circuit (1) is connected between the input and output of the receiver circuit (9, 10) having a control amplifier device (3). The frequency response of the control amplifier device (3) is selected so that the degree of suppression drops to a predeterminable extent with an increase in the differential frequency above the cut-off frequency ($f_g$) of the control amplifier device (3).

The present invention is explained in greater detail below with reference to the drawings.

DETAILED DESCRIPTION

The present invention is based on a known circuit for suppressing the component of the transmission signal which is diverted directly into the receiver circuit of the radar. This known circuit is referred to below as an RPC (reflected power canceler) circuit. An RPC circuit is described, for example, in "Solving the problems of a single antenna frequency-modulated CW radar," P. D. L. Beasley et al., 1990 IEEE International Radar Conference, pp. 391–395, which is hereby incorporated by reference herein. A similar circuit which is known as a "feed through nuller" is described in "A high performance CW receiver using feedthru nulling," F. J. O'Hara et al., Microwave Journal, September 1963, pp. 63–71, which is hereby incorporated by reference herein.

These known circuits form a closed loop in which the incoming signal from one antenna, reflected to the input of the receiver circuit, is superimposed on another signal in phase opposition derived from a transmitter in such a way as to yield complete suppression. Disadvantageous overcoupling of transmitter noise to the receiver circuit in particular is suppressed in this way. However, this known solution does not take into account the variable distance from a target object to be detected.

The concept of a preferred embodiment of the present invention will now be explained with reference to FIG. 1. Although a preferred embodiment of the present invention is shown in conjunction with a receiver of a frequency-modulated continuous-wave radar, it is self-evident that the receiver is not limited to such radar applications, but instead can be used for increasing the dynamic range of a circuit in other applications with which those skilled in the art would be familiar.

Figure 1:
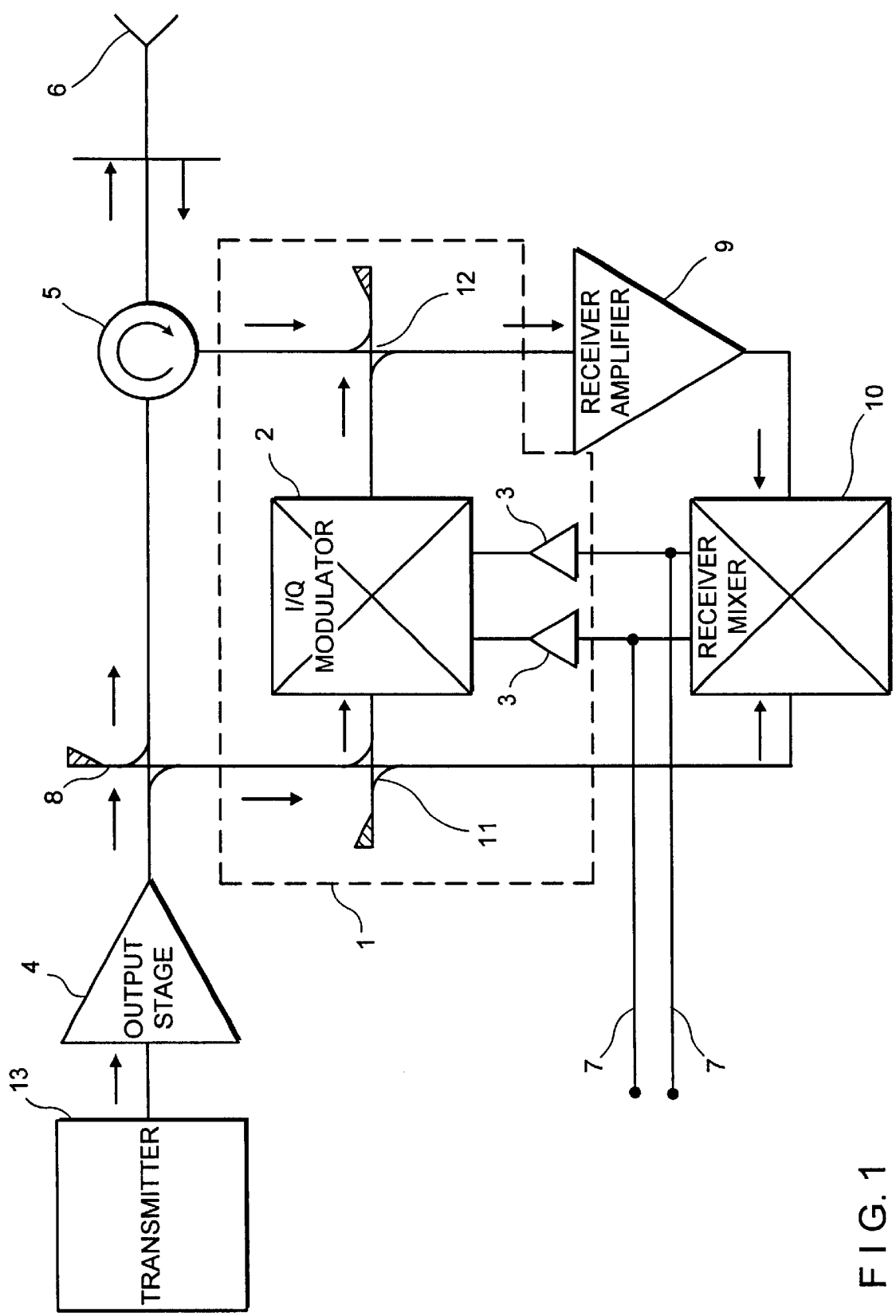
FIG. 1 shows a block diagram of an embodiment of the present invention for increasing the dynamic range of frequency-modulated continuous-wave radar.

The embodiment in FIG. 1 includes RPC circuit 1 which is known per se and has an I/Q modulator (vector modulator) 2 and respective control amplifiers 3 for the I and Q signals located in the intermediate frequency range. FIG. 1 shows two control amplifiers for the respective I and Q signals. However, it is conceivable for a greater or lesser number of control amplifiers to be selected in agreement with the respective requirements of the device according to the present invention for increasing the dynamic range of frequency-modulated continuous-wave radar.

A transmitter 13 of a frequency-modulated continuous-wave radar which is shown schematically has an output stage 4. Output stage 4 transmits the transmission signal of the frequency-modulated continuous-wave radar to a send/receive antenna 6 via a circulator 5. Part of the transmission signal is output through a first directional coupler 8, as shown in FIG. 1, and sent to RPC circuit 1. The echo signals are sent through antenna 6 and circulator 5 to a low-noise HF receiver amplifier 9, which in turn supplies the amplified echo signals to a receiver mixer 10. Receiver mixer 10 is in turn supplied with part of the transmission signal output through a second directional coupler 21, and it generates, in a way known per se, intermediate frequency signals 7 which are used to control RPC circuit 1.

Circulator 5 is designed to separate transmission signals from 7 the echo signals received. However, part of the power of the transmission signal is diverted without prior radiation to the target object through circulator 5 to receiver amplifier 9 and falsifies the echo signals originating from antenna 6, which can lead to a general deterioration in sensitivity of the receiver. In addition, some of the power of the transmission signal can be reflected by antenna 6.

Figure 2:
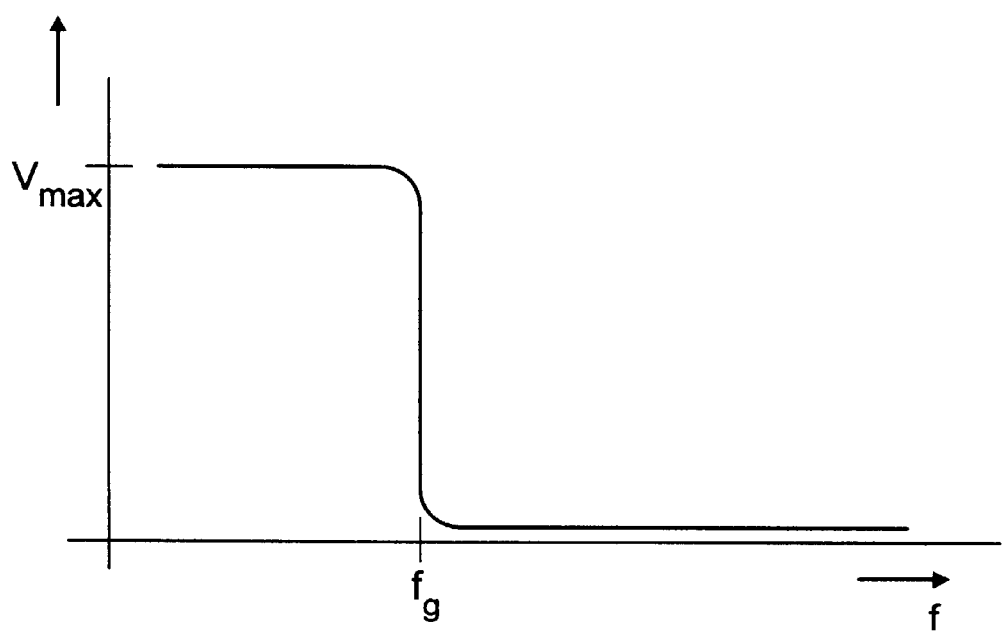
FIG. 2 shows the design of the controller gain in a circuit from FIG. 1 for suppressing the component of the transmission signal which is diverted directly into the receiver circuit of the radar, where the frequency is plotted on the abscissa and the controller gain is plotted on the ordinate.

To avoid the above phenomenon, the closed loop in RPC circuit 1 is designed so that the power of the transmission signal (or the power of the transmission signal diverted through the circulator) reflected by antenna 6 itself is compensated by superpositioning with an equally large signal which is generated by I/Q modulator 2 in phase opposition and is injected into the path between the circulator and the amplifier through a third directional coupler 12. To do so, the frequency response of control amplifier 3 of known RPC circuit 1 is sharply limited according to FIG. 2, namely at an upper cut-off frequency $f_g$ which corresponds to the greatest differential frequency of intermediate frequency signal 7 (or the video frequency) which occurs between the instantaneous transmission frequency and the returning wave from antenna 6 (echo signal without radiation).

The present invention is first based on the fact that the differential frequency increases proportionally with an increase in distance. With an increase in the control bandwidth of control amplifier 3 due to the increase in its cut-off frequency $f_g$, echo signals from a certain distance in front of the radar can also be suppressed accordingly.

In addition, it has been found that the degree of compensation or the depth of suppression of the echo signals of the target object depends greatly on the extent of the controller gain of control amplifier 3, because the residual error in compensation decreases with an increase in gain. For example, suppression values of approximately 50 dB are achieved in practical implementations of RPC circuit 1, corresponding to a residue of the input signal of the receiver of 1/100000 of the original value.

The present invention provides in an especially advantageous manner for the frequency response of control amplifier 3, which is part of the closed loop, to be selected so that the degree of suppression drops with an increase in differential frequency (video frequency) to a predeterminable extent above cut-off frequency $f_g$.

Figure 3:
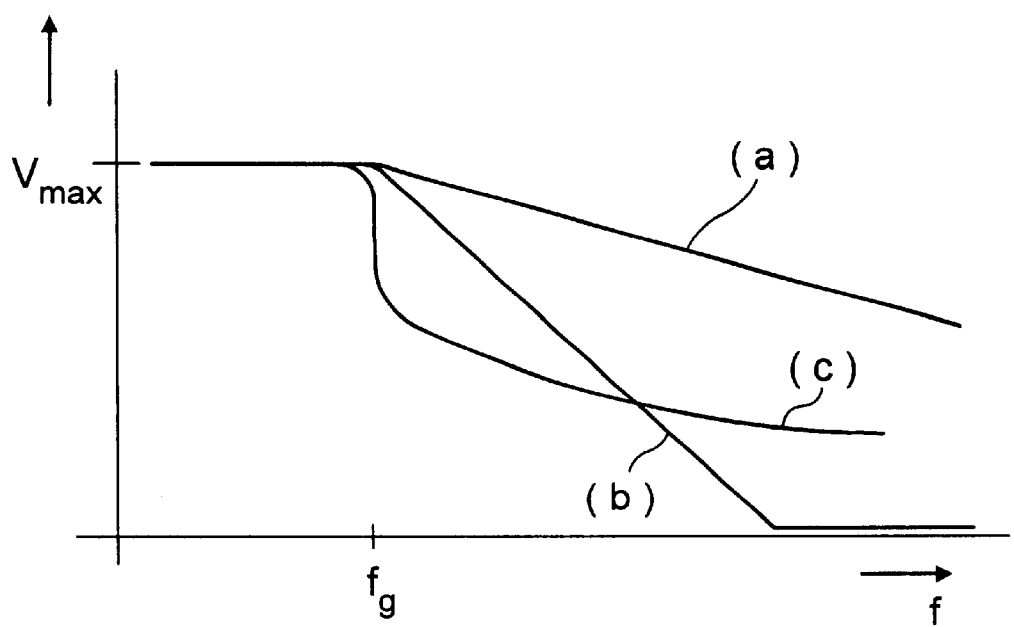
FIG. 3 shows the design of the controller gain according to the present invention in the device for increasing the dynamic range of frequency-modulated continuous-wave radar according to FIG. 1, where the frequency is plotted on the abscissa and the controller gain is plotted on the ordinate.

This can be accomplished in practice by suitable shaping of the frequency response of control amplifier 3, as illustrated in FIG. 3, where three different qualitative curves have been plotted. The frequency f, is plotted against the control gain v, wherein $f_g$ is the cut-off frequency and $v_{max}$ is the maximum control gain.

Curve (a) leads to the greatest possible suppression of the target echos in the near range with a shallow decline for increasing distance. Curve (b), however, shows a steeper drop in suppression with distance, so that complete lack of effect of the control can be achieved at short distances. In this case, the situation resembles that which can occur entirely without a control circuit. Curve (c) does not produce the full extent of suppression in the near range due to a lower initial value of the control gain above cut-off frequency $f_g$, and it also yields a different dependence of the extent of suppression on distance due to the different shape above cut-off frequency $f_g$ in comparison with curves (a) and (b).

As indicated by the preceding description, the present invention provides a device for increasing the dynamic range of frequency-modulated continuous-wave radar which can operate with relatively low powers and is suitable for monolithic integration for automobile radar applications. The latter is implemented in particular by avoiding the high-pass filter required with traditional applications; as explained above, this high-pass filter would be connected downstream from the high-frequency part of the radar receiver. According to the present invention, therefore, false echos and unwanted false targets which occur even with traditional options due to intermodulation and other nonlinear processes can be avoided especially advantageously.

What is claimed is:

1. A device for increasing a dynamic range of a frequency-modulated continuous-wave radar, the device comprising:
    a transmitter for transmitting transmission signals;
    a send/receive antenna;
    a receiver circuit,
    a circulator for relaying the transmission signals to the send/receive antenna and for diverting echo signals received from a target object to an input of the receiver circuit, the receiver circuit being capable of generating a signal having a differential frequency corresponding to a distance from the target object based on the transmission signals and the echo signals; and
    a reflected power canceler circuit connected between the input and an output of the receiver circuit and including a control amplifier device, the frequency response of the control amplifier device being selected so that a degree of a suppression decreases from a maximum by a predeterminable amount with an increase in the differential frequency above a cut-off frequency of the control amplifier device.

2. The device as recited in claim 1 wherein the degree of the suppression decreases linearly from the maximum as the differential frequency increases from the cut-off frequency.

3. The device as recited in claim 1 wherein the degree of the suppression decreases from the maximum to a predetermined level when the differential frequency reaches the cut-off frequency and the degree of the suppression continues to decrease at a decreasing rate when as the differential frequency increases past the cut-off frequency.

4. The device as recited in claim 2 wherein the linear decrease in the suppression is gradual.

5. The device as recited in claim 1 wherein a gain of the control amplifier device is selected so that the degree of the suppression is less than the maximum at a near range for differential frequency values greater than the cut-off frequency.

6. The device as recited in claim 1 wherein the frequency response has a linear drop above the cut-off frequency.

7. A device for increasing a dynamic range of a frequency-modulated continuous-wave radar, the device comprising:

a receiver circuit for determining a distance to a target object based on a differential frequency between a transmission signal and an echo signal;

a reflected power canceler including a control amplifier device, whereby the reflected power canceler is controlled by the differential frequency generated by the receiver circuit;

a frequency response of the control amplifier device being selected so that a degree of suppression is at a maximum when the differential frequency is at a cut-off frequency of the control amplifier device and the degree of suppression decreases by a predeterminable amount as the differential frequency increases above the cut-off frequency.

8. A device for increasing a dynamic range of a frequency-modulated continuous-wave radar, the device comprising:

a receiver circuit configured to determine a distance to a target object based on a differential frequency between a transmission signal and an echo signal; and a reflected power canceler including a control amplifier device, the reflected power canceler configured to be controlled in accordance with the differential frequency generated by the receiver circuit;

wherein a frequency response of the control amplifier device is selected so that a degree of suppression is at a maximum when the differential frequency is at a cut-off frequency of the control amplifier device and the degree of suppression decreases by a predeterminable amount as the differential frequency increases above the cut-off frequency.

* * * * *